(12) United States Patent
Hou et al.

(10) Patent No.: US 10,977,582 B2
(45) Date of Patent: Apr. 13, 2021

(54) CROWD CONTROL AND CHECK-IN TIME RECOMMENDATION IN PUBLIC TRANSPORTATION STATIONS

(71) Applicant: SAP SE, Walldorf (DE)

(72) Inventors: Likun Hou, Shainghai (CN); Xin Chen, Shanghai (CN); Leiyi Yao, Shanghai (CN)

(73) Assignee: SAP SE, Walldorf (DE)

( * ) Notice: Subject to any disclaimer, the term of this patent is extended or adjusted under 35 U.S.C. 154(b) by 683 days.

(21) Appl. No.: 15/632,057

(22) Filed: Jun. 23, 2017

(65) Prior Publication Data

US 2018/0374003 A1   Dec. 27, 2018

(51) Int. Cl.
*G06Q 10/02* (2012.01)

(52) U.S. Cl.
CPC ......... *G06Q 10/02* (2013.01); *G06Q 2240/00* (2013.01)

(58) Field of Classification Search
None
See application file for complete search history.

(56) References Cited

U.S. PATENT DOCUMENTS

| | | | |
|---|---|---|---|
| 6,910,628 B1 | 6/2005 | Sehr | |
| 9,519,903 B2 | 12/2016 | Kannan et al. | |
| 2013/0204737 A1 | 8/2013 | Agarwal et al. | |
| 2014/0343974 A1* | 11/2014 | Graells | G06Q 10/02 705/5 |
| 2015/0186802 A1 | 7/2015 | Hulbert | |
| 2015/0186831 A1 | 7/2015 | Hulbert et al. | |
| 2015/0286984 A1 | 10/2015 | Dikman et al. | |
| 2016/0147756 A1 | 5/2016 | Dalili et al. | |

FOREIGN PATENT DOCUMENTS

| | | |
|---|---|---|
| WO | WO 2003/090144 | 10/2003 |
| WO | WO 2008/015709 | 2/2008 |
| WO | WO 2015/145139 | 10/2015 |

* cited by examiner

*Primary Examiner* — Tonya Joseph
(74) *Attorney, Agent, or Firm* — Fish & Richardson P.C.

(57) ABSTRACT

Methods, systems, and computer-readable storage media for crowd control based on check-in time recommendations, including operations of receiving, from a plurality of users, travel information, the travel information including, for each of the plurality of users, a user identification, a departure location, and a departure time, determining a total number of passengers within a time interval associated to the departure time from the departure location, generating a recommended check-in time for each of the plurality of users based on the travel information and the total number of passengers, displaying for each of the plurality of users the recommended check-in time, and activating a setting of a ticket verification device to prevent access to a portion of the departure location for each of the plurality of users before the recommended check-in time.

20 Claims, 4 Drawing Sheets

CROWD CONTROL AND CHECK-IN TIME RECOMMENDATION IN PUBLIC TRANSPORTATION STATIONS

BACKGROUND

Public transportation planning plays a very important role in regional and national infrastructure and security. Public transportation stations, such as train stations, are accessed by the public and often need to be optimized for crowd management. For example, train stations can become overcrowded due to many reasons, such as major local events, usage of trains during rush hours in working days, and public holidays. Crowd control is a public security practice that manages large crowds within public areas to prevent the outbreak of crowd crushes, and to optimize distribution and dispersion of passengers.

SUMMARY

Implementations of the present disclosure include computer-implemented methods for crowd control based on check-in time recommendations. In some implementations, actions include receiving, from a plurality of users, travel information, the travel information including, for each of the plurality of users, a user identification, a departure location, and a departure time, determining a total number of passengers within a time interval associated to the departure time from the departure location, generating a recommended check-in time for each of the plurality of users based on the travel information and the total number of passengers, displaying for each of the plurality of users the recommended check-in time, and activating a setting of a ticket verification device to prevent access to a portion of the departure location for each of the plurality of users before the recommended check-in time. Other implementations of this aspect include corresponding systems, apparatus, and computer programs, configured to perform the actions of the methods, encoded on computer storage devices.

These and other implementations can each optionally include one or more of the following features: the travel information further includes for each of the plurality of users one or more activity indicators; the one or more activity indicators include one or more entertainment interests; actions further include retrieving a vendor information based on the travel information and matching the vendor information to the one or more activity indicators and in response to matching, generating one or more recommended tasks available for the plurality of users before the recommended check-in time, wherein generating the one or more recommended tasks is based on a maximum number of users per recommended task; actions further include receiving an acceptance or rejection of the one or more recommended tasks and, in response to receiving the acceptance, generating credit points.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to systems and methods for crowd control. More particularly, implementations of the present disclosure are directed to generating check-in and/or boarding time recommendations for a passenger scheduled to use a public transportation station, and modifying the settings of one or more devices for reducing the number of people in a section of the transportation station, and for providing a more efficient use of the station resources.

Implementations can include actions of receiving, from a plurality of users, travel information, the travel information including, for each of the plurality of users, a user identification, a departure location, and a departure time, determining a total number of passengers within a time interval associated to the departure time from the departure location, generating a recommended check-in time for each of the plurality of users based on the travel information and the total number of passengers, displaying for each of the plurality of users the recommended check-in time, and activating a setting of a ticket verification device to prevent access to a portion of the departure location for each of the plurality of users before the recommended check-in time.

Figure 1:
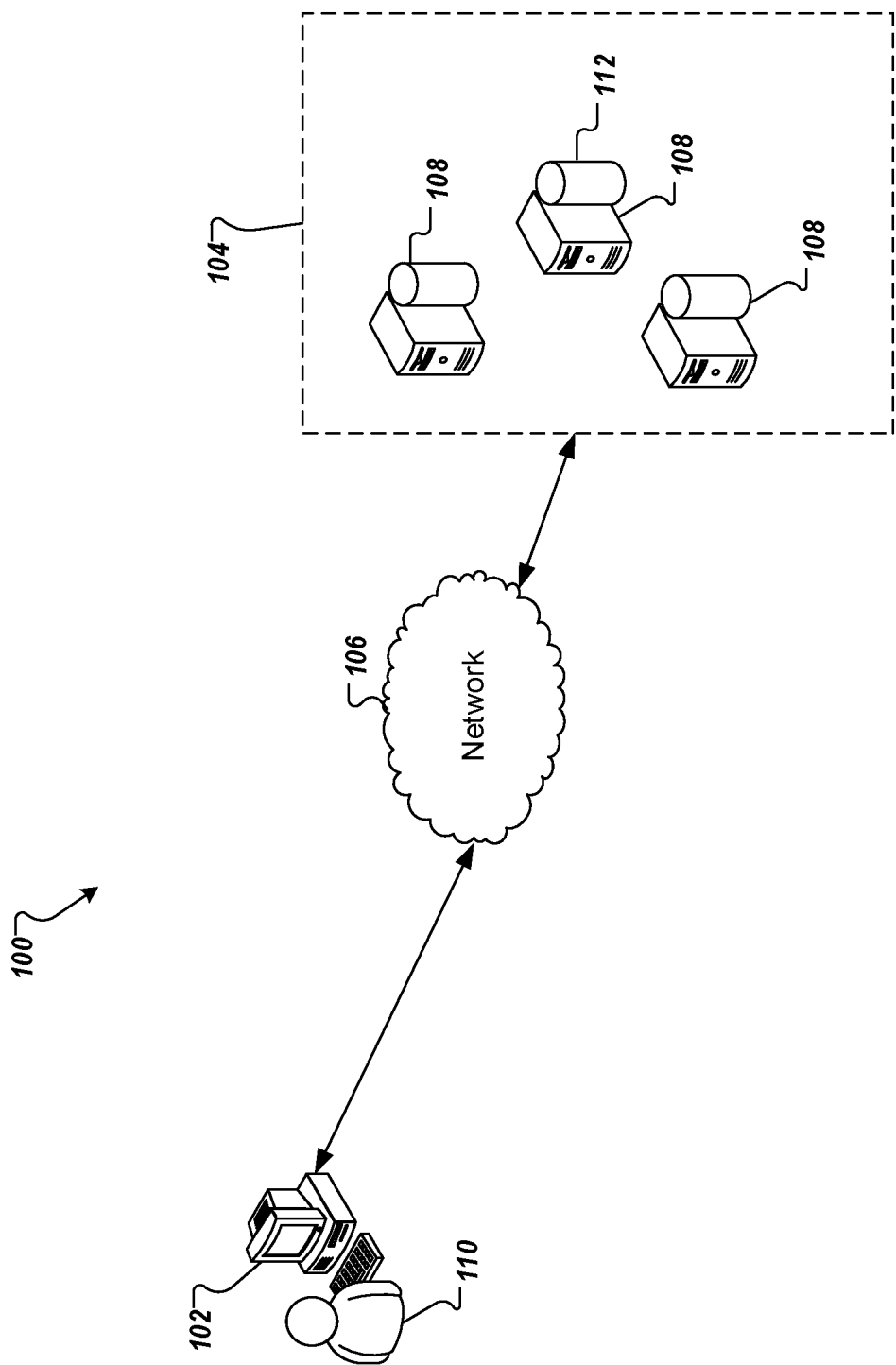
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user (e.g., a passenger and/or an employee of the public transportation station), who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host a check-in recommendation service (e.g., provided as one or more computer-executable programs executed by one or more computing devices). For example, input data can be provided to the server system (e.g., from the client device 102), and the server system can process the input data through the check-in recommendation service to provide result data. For example, the server system 104 can send the result data to the client device 102 over the network 106 for display to the user 110.

Implementations of the present disclosure are described in detail herein with reference to an example context. The example context includes providing recommendations for check-in at a train station for a plurality of people. It is contemplated, however, that implementations of the present disclosure can be realized in any public transportation station (e.g., subway station, bus station, and/or airport).

The train station can include N platforms denoted by $T_1, \ldots, T_N$. Each platform can be used by a train that has a particular departure time. The departure times can be used to determine check-in times that have allocated time slots $M_1, \ldots, M_N$. Without loss of generality, time slots can be started from 0. A check-in service rate $\mu$ defines the number of passengers that can pass the check-in counter per time slot. The suggested number of passengers to be checked-in at platform $T_k$ during time slot $M_i$ can be denoted as $z_i^{T_k}$. The total number of passengers for platform $T_i$ can be denoted as $P_{T_i}$.

In some implementations, one or more constraints have to be satisfied for generating a check-in recommendation. An example constraint can include that all the passengers who purchased tickets involving the use of the transportation station must be allocated a time slot for check-in.

$$\sum_i z_i^{T_k} = T_k, k = 1, \ldots, N$$

The allocated time slots can be defined such that $M_1 \leq \ldots \leq M_N$. Another example constraint can include that all the passengers associated with platform $T_k$ must be served before the train departure time $M_k$.

$$\sum_{i \leq M_k} \sum_k z_i^{T_k} \leq \mu M_k$$

A goal of the process can include suggesting check-in time for passengers to prevent overcrowding at least a portion of the train station according to the following equation, which describes the shift of the peak time slot for crowd control by minimizing the number of passengers per time interval in the worst case scenario (e.g., during peak hour).

$$\text{Min. Max}_i \left\{ \sum_k z_i^{T_k} \right\}$$

In some implementations, the number of passengers allocated to each check-in time slot can be selected based on random sampling from the entire multitude of passengers. In some implementations, the number of passengers allocated to each check-in time slot can be selected based on consumption information associated to each of the passengers. The consumption information can be retrieved from one or more mobile paying methods (e.g., Apple Pay, Alipay, Wechat Pay, etc.). For example, for passengers that are identified as having relatively high consumption tendencies in the waiting area, the system can generate recommendations to arrive at the transportation station at an earlier time than other passengers (with lower consumption tendencies). The recommended check-in time for passengers with high consumption tendencies can be selected to include a time period that can be allocated to enjoying consumer services provided in the waiting area.

For passengers that are identified as having relatively low consumption tendencies, the system can generate recommendations to arrive at the transportation station at a later time-slot for checking-in than other passengers (with higher consumption tendencies). In some implementations, the consumption tendency of each passenger is not completely known and it can be determined by using techniques configured to recover the relatively 'full' information from a 'partial' data set. By assuming the heterogeneity of availability on consumption information, as well as the correlations of the true information among different passengers, low-rank enforcement techniques can be used to recover the missing information that is not available.

For example, a consumption tendency $x_n$ can be associated to each passenger (from 1 to N) in a group of N passengers. The consumption tendency $x_n$ can be defined as a vector of dimension M, in which each entry represents, for instance, a passenger's estimated willingness to pay for a specific service provided in the train station, $1 \leq n \leq N$. The consumption tendency $x_n$ can be generated based on data derived from past recordings of one or more mobile paying methods or data recorded by service providers of transportation stations. The consumption tendency $x_n$ can be incomplete such that one or more entries of $x_n$, with $1 \leq n \leq N$ can include empty fields (e.g., marked by non-numeric values such as #). The consumption tendency $x_n$ can include inaccurate values due to measurement error. The inaccurate values of the consumption tendency $x_n$ can be corrected considering a Gaussian distribution of the values. By treating all consumption tendencies as column vectors and concatenating the obtained vectors, the consumption tendencies for the group of N passengers can be defined as a design matrix D.

$$\begin{vmatrix} x_1^1 & x_2^1 & x_3^1 & \ldots & \ldots & x_N^1 \\ \# & x_2^2 & x_3^2 & \ldots & \ldots & x_N^2 \\ x_1^3 & x_2^3 & \# & \ldots & \ldots & x_N^3 \\ \ldots & \ldots & \ldots & \ldots & \ldots & \ldots \\ x_1^M & x_2^M & x_3^M & \ldots & \ldots & X_N^M \end{vmatrix}$$

The information recovery model can be defined based on the corresponding full data matrix X associated to D and the set of entries with known values $\Gamma$:

$$\tfrac{1}{2}|P_\Gamma(X-D)|_F^2 + \lambda|X|_*,$$

$$s.t. 0 \le x_i^j \le 1, i=1,2,\ldots,N, j=1,2,\ldots,M.$$

The term $\lambda>0$ can be a tuning parameter (e.g., manually, semi-automatically or automatically tuning parameter). The term $P_\Gamma$ represents the restriction operator with respect to the set $\Gamma$, which retains all entries with indices included in $\Gamma$ and sets remaining values to 0. The notation $\|\cdot\|_F$ denotes the Frobenius norm of a matrix, and $|X|_*$ is the nuclear norm of X (e.g., summation of all singular values of matrix X). The information recovery model can be solved using iterative approaches, such as alternating direction methods of multipliers (ADMM). In some implementations, passengers' consumption information can be updated over time until the information recovery model includes all entries, such that each of the entries is accurate and up to date.

The system can use the passengers' consumption information and consumer services provided by the train station to compute a consumption score for each passenger. For example, the consumption score for each passenger can include the consumption tendency information vector for each passenger, and the service weights associated with all consumer services provided by the train station. Each consumer service provided by the train station can be associated with a known weight that reflects, for example, the ability of the consumer service to gain profits from the incoming customers. The consumption score for each passenger can indicate the probability of using the available services. For example, the higher a consumption score, the more money the passenger is likely to spend at the consumer service vendors within the waiting area.

The passengers can be grouped based on the determined consumption scores. The check-in time recommendation can be based on the groups. For example, groups with higher scores are recommended an earlier checking-in period and groups with lower score are recommended a later checking-in period. The passengers complying with the recommended check in time can be provided credit points that can be converted to actual benefits, such as services.

Figure 2:
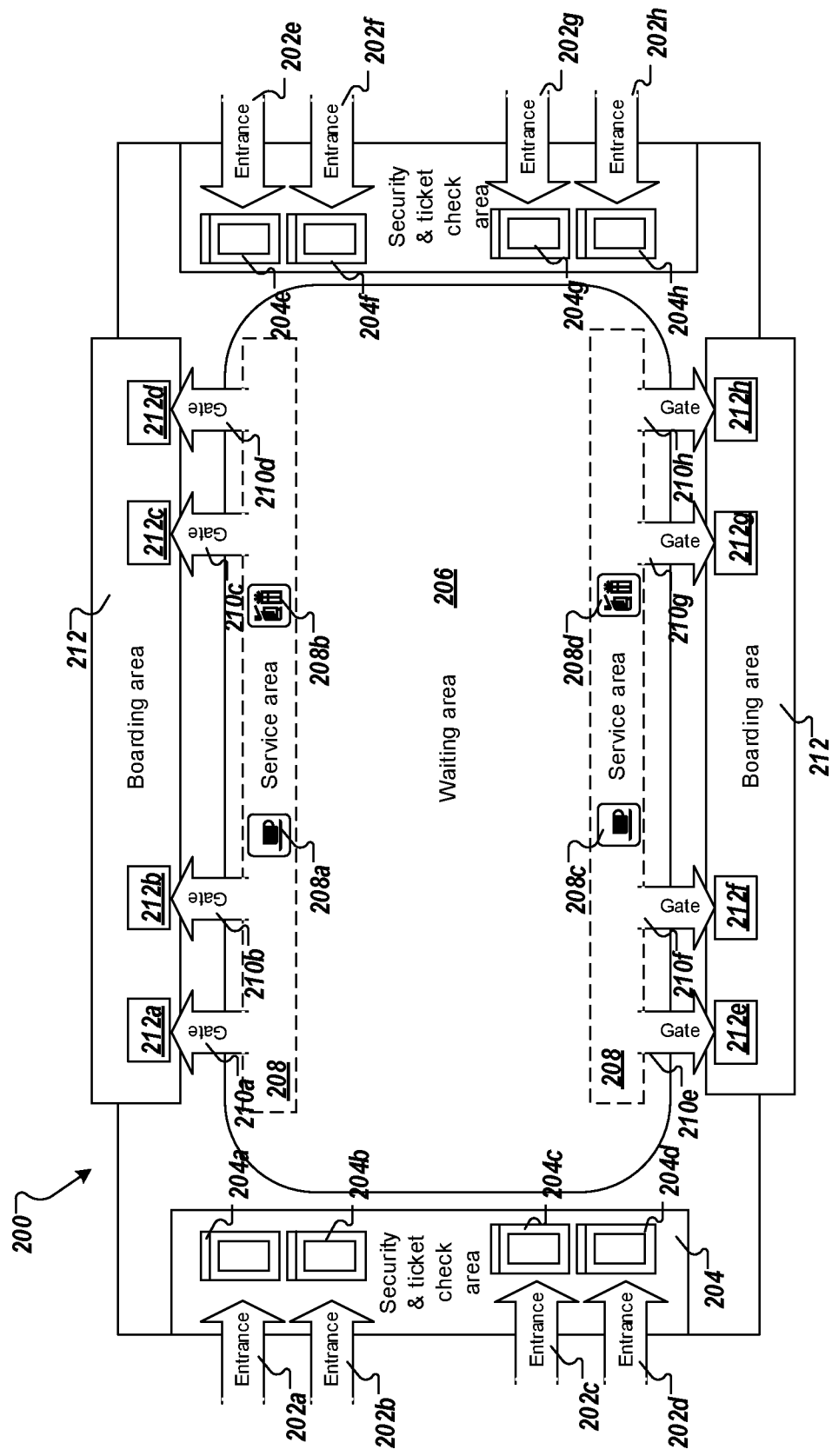
FIG. 2 depicts an example portion of a train station, within which implementations of the present disclosure can be applied.

FIG. 2 depicts an example portion of a train station 200, within which implementations of the present disclosure can be applied. In the depicted example, the example architecture 200 includes one or more entrances 202a-202h, a security and ticket check area 204, a waiting area 206, a service area 208, one or more gates 210a-210h, and a boarding area 212.

The security and ticket check area 204 includes one or more check-in devices 204a-204h. For example, the security and ticket check area 204 can be configured such that at least one check-in device 204a-204h exists at each entrance 202a-202h. The check-in devices 204a-204h can be configured to retrieve check-in data associated to a passenger, including the recommended check-in time, and generate a response based on processing of the check-in data. The response can include a validation of check-in data and a result of a comparison between the recommended check-in time and the actual check-in time. The validation can trigger an approval of the check-in providing the passenger access to the waiting area 206 or a denial of the check-in preventing the passenger access to the waiting area 206. The comparison can trigger an approval of the check-in providing the passenger access to the waiting area 206 with or without generation of credit points or a denial of the check-in preventing the passenger access to the waiting area 206. In some implementations, the credit points can be associated to one or more service providers 208a-208d that are available in the service area 208. The check-in devices 204a-204h can be configured to affect a functionality of the device (e.g., open an access door or barrier), display the response to a user of the device and transmit the response to a remote device and/or database over a network, as described with reference to FIG. 1.

The service area can be configured to include multiple service providers 208a-208d. The service providers 208a-208d can be configured to provide multiple services to users, such purchase of items (e.g., travel objects, food, drinks, books, etc.) and services (e.g., spa services, mobile device services, etc.). Each service provider can include one or more devices. The devices can be configured to receive credit points associated to a passenger, to update a service cost based on the credit points, to record service data (e.g., items and services purchased by each passenger) and transmit the data to a database over a network, as described with reference to FIG. 1.

The boarding area 212 includes one or more boarding devices 212a-212h and platforms. For example, the boarding area 212 can be configured such that at least one boarding device 212a-212h exists at each gate 210a-210h. The boarding devices 212a-212h can be configured to retrieve boarding data associated to a passenger, including the recommended boarding time, and generate a response based on processing of the boarding data. The response can include a validation of boarding data and a result of a comparison between the recommended boarding time and platform and the actual boarding time and platform. The validation can trigger an approval of the boarding providing the passenger access to a platform or a denial of the boarding preventing the passenger access to the platform. The comparison can trigger an approval of the boarding providing the passenger access to the platform or a denial of the boarding preventing the passenger access to the platform. The boarding devices 212a-212h can be configured to affect a functionality of the device (e.g., open an access door or barrier), display the response to a user of the device and transmit the response to a remote device and/or database over a network, as described with reference to FIG. 1.

Figure 3:
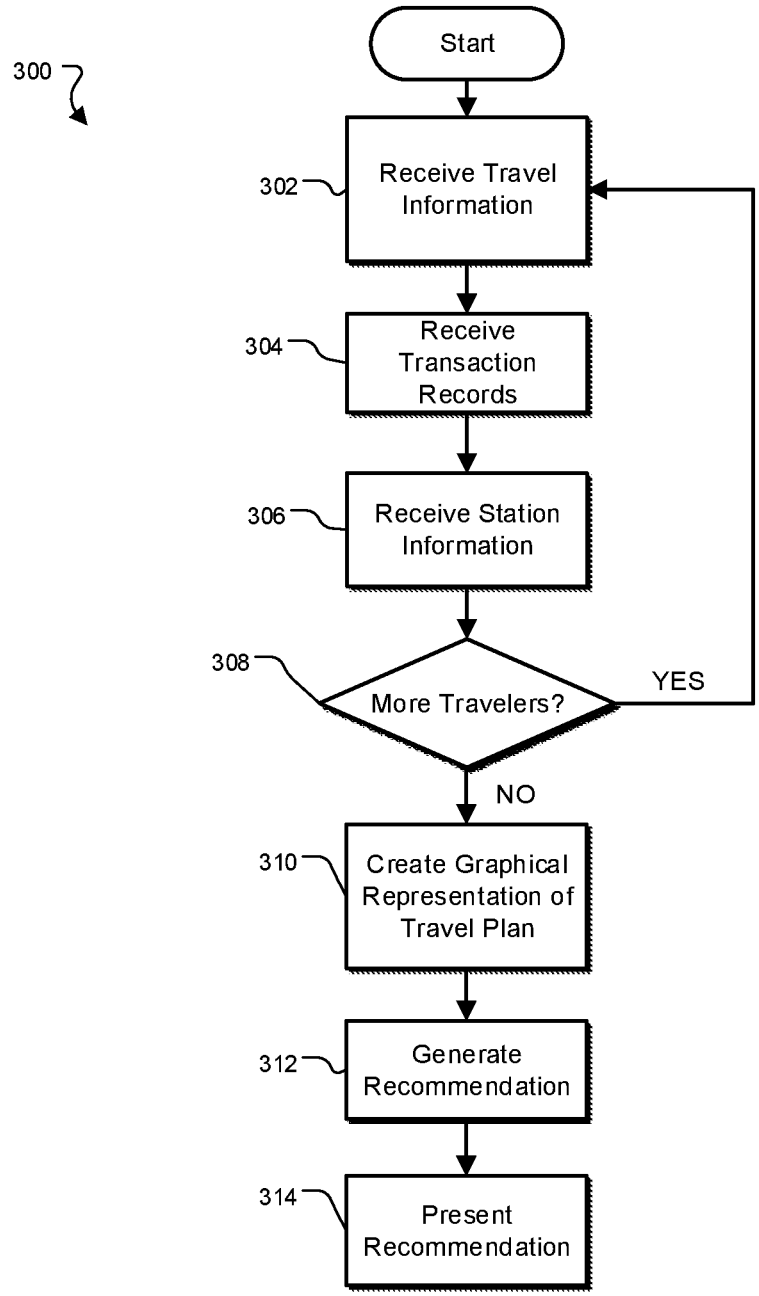
FIG. 3 depicts an example process that can be executed in accordance with implementations of the present disclosure.

FIG. 3 depicts an example process 300 that can be provided as one or more computer-executable programs executed using one or more computing devices, as described with reference to FIGS. 1 and 2. In some implementations, the example process 300 is executed to generate a check-in recommendation in accordance with implementations of the present disclosure.

Travel information is received by one or more processors and from a plurality of users (302). The travel information can be generated at the purchase of a travel ticket. The travel information can include, for each of the plurality of passengers, a passenger's identification (e.g., passport number, driving license number, etc.), date of birth, status providing access to particular areas of a transportation station (e.g., diplomatic status, first class, business class, active military, etc.), a departure location, a departure time and request for special needs (e.g., wheelchair ramp). The travel information can include for each of the plurality of users one or more activity indicators that include one or more entertainment interests (e.g., reading, eating, drinking, spa services, listening to music, etc.). The activity indicators can be provided by the passenger or can be derived from previous purchase data associated to the passenger, as submitted by one or more service providers. In some implementations the activity indicators can include an association between entertainment interests and duration of travel. For example, a passenger can indicate interest in purchasing books before hours long trips, interest in purchasing magazines before of relatively short trips, interest in purchasing food within particular time intervals, such as morning and noon and/or interest in purchasing spa services, within particular time intervals, such as evening. The travel information can be provided as illustrated by Table 1.

TABLE 1

Travel information table

| Name | Description |
| --- | --- |
| Name | Passenger name |
| ID | Passenger ID |
| Train_Number | Number of a Train |
| Station_ID | ID of the boarding station |
| Date | Date of departure |
| Departure | Time of departure |

Transaction records are received (304). In some implementations, the transaction records are automatically transmitted by a travel ticket provider or they are transmitted in response to a query associated with the purchased travel ticket. The transaction records can include, for each of the plurality of passengers, passenger's name, passenger's identifier (e.g., passport number, driving license number, etc.), trip identifier, travel category (e.g., first class, business class, economy class, etc.), travel departure location, travel arrival location, travel departure time and travel duration.

Station information is received (306). In some implementations, the transportation station information is automatically transmitted by a travel ticket provider or it is transmitted in response to a query associated with the purchased travel ticket. The transportation station information can include an identification (ID) of the transportation station, the number of entrances in the security and ticket check area, number of gates, size or capacity of different portions of the transportation station (e.g., waiting area, first class area, etc.), vendor information, areas and entries for passengers with special needs, estimated duration of security and check-in, and estimated duration of boarding. The vendor information can include the services available within the waiting area of the transportation station. The transportation station information can be provided as illustrated by Table 2.

TABLE 2

Station information table

| Name | Description |
| --- | --- |
| Station_ID | ID of a station |
| Number_Entrance | Number of entrances for security and ticket check |
| Estimated_service_time | Estimated service duration of security and ticket check |

The total number of passengers within a time interval associated to the departure time from the departure location is determined (308). For example, the total number of passengers can be determined as the number of available seats or maximum number of tickets that can be sold or were sold associated to the departure location and departure time. The system can compare the number of passengers for whom the travel information was received to the total number of passengers. If it is determined that the number is smaller than the total number of passengers, the process returns to retrieving travel information (302). If it is determined that the number is equal to the total number of passengers, a graphical representation of the travel plan is generated (310).

A recommendation is generated (312). The recommendation can be generated based on the total number of people that are expected to depart within a common time interval, based on one or more characteristics of the transportation station (e.g., estimated security and check-in duration, surface of one or more portions of the transportation station, available services, and estimated boarding duration) and a consumer score, associated to entertainment interests of the user, as described with reference to FIG. 1. For example, travel information can be matched to the vendor information to identify available services that correspond to the provided activity indicators. In some implementations, the recommendation can be modified based on a passenger's status, a travel category and/or passenger's special needs. The recommendation can include station number, transportation identifier (e.g., train number), entrance number, recommended time slot (start time and end time) for check-in, recommended services within waiting area, gate number, platform number, and recommended time slot (start time and end time) for boarding. The recommendation can be provided as illustrated by Table 3.

TABLE 3

Recommend result table

| Name | Description |
| --- | --- |
| Name | Passenger name |
| ID | Passenger ID |
| Station_ID | Station ID |
| Timeslot_ID | Recommend arrival timeslot ID |
| From_time | Start time of a timeslot |
| To_time | End time of a timeslot |

The recommendation is transmitted to a passenger's device (e.g., mobile phone) and one or more devices of the transportation station (e.g., check-in device, service device and/or boarding device) (314). The recommendation can be transmitted days or hours before the recommended check-in time. In some implementations the recommendation is displayed on a device of the passenger such that it provides an option to the passenger to accept of refuse the recommendation. In response to receiving an input indicating an acceptance of the check-in recommendation, the passenger's device can automatically initiate one or more applications to support the passenger in performing an action associated to the recommendation (e.g., providing directions to a service provider). In some implementations, performing a check-in within the recommended check-in timeslot can be interpreted by the check-in device as an acceptance of the recommendation. The acceptance of the recommendation (e.g., timely arrival at the check-in area) can trigger the issuance of credit points and can initiate one or more applications to support the passenger in performing an action associated to the recommendation.

In some implementations, a check-in device and/or a boarding device can perform a comparison between the recommended time and the actual time associated to the check-in or boarding and a comparison between the current number of passengers within a particular area of the transportation station and the capacity of the area of the transportation station. In response to determining that the action time is within the recommended timeslot, the check-in device and/or the boarding device can activate a function (e.g., open) of an element of the device (e.g., door or barrier). In response to determining that the action time is before the recommended timeslot and the current number of passengers within a particular area of the transportation station is within a critical range from the capacity of the area of the transportation station or one or more parameters do not match (e.g., access gate leads to a platform different than the platform associated to the travel), the check-in device and/or the boarding device can activate a function (e.g., close) of an element of the device (e.g., door or barrier) and/or generate an alert associated with the function. The alert can indicate a reason associated with prevention of access to an area of the transportation station for security reasons and/or can provide indications for future actions (e.g., return to check-in after a given time or proceed to a different gate for access).

Implementations of the present disclosure provide one or more of the following example advantages. Methods for generating check-in and boarding recommendation can use passenger data to manage large crowds within public areas to prevent the outbreak of crowd crushes, by preventing access to areas of transportation station that are close to capacity through one or more functions of check-in and boarding devices. The recommendations support optimization of distribution and dispersion of passengers according to interests of passengers relative to one or more characteristics of a train station, bus station and/or airport. The recommendations can optimize identification of services of interest for passengers and, therefore it can help the service vendors increase their profits. Methods for generating check-in and boarding recommendation can use data that is missing consumption tendency information of passengers regarding interests in retailers of corresponding stations, by applying the cutting-edge data mining techniques (e.g., low-rank matrix completion) to provide an accurate check-in time based on an accurate prediction of the interests of passengers. Methods for generating check-in and boarding recommendation include a credit point incentive mechanism to encourage passengers to follow the boarding recommendation, which decreases a chance of an outbreak of crowd crushes. Methods for generating check-in and boarding recommendation optimize the distribution of the number of passengers per time intervals, which shifts the peak hour to avoid the outbreaks of crowd crushes.

Figure 4:
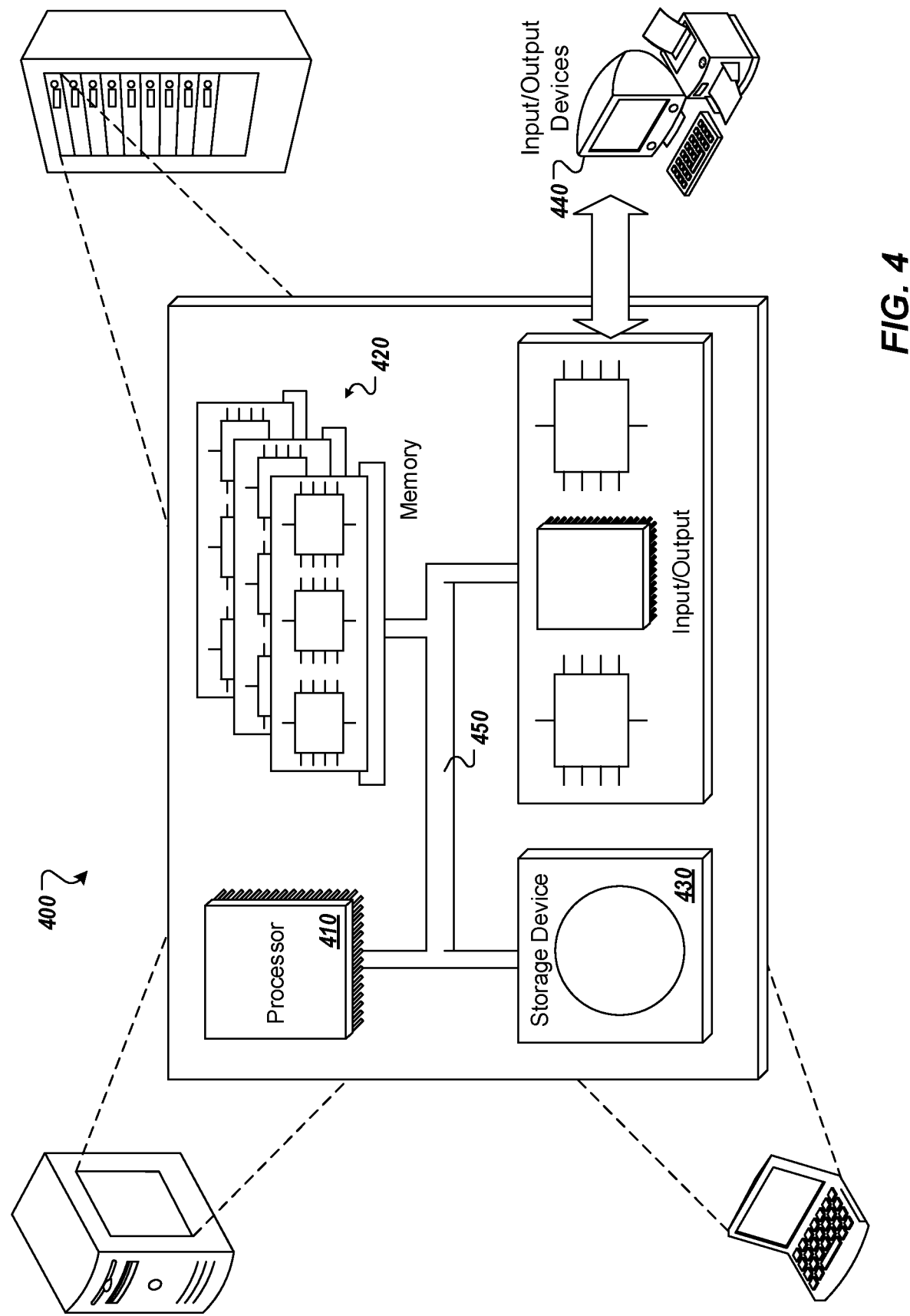
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for crowd control based on check-in time recommendations, the method being executed by one or more processors and comprising:
   receiving, by the one or more processors and from a plurality of user devices of a plurality of users, travel information, the travel information comprising, for each of the plurality of users, a user identification, a departure location, and a departure time;
   updating, by the one or more processors, the travel information using an automatically tuning parameter;
   determining, by the one or more processors, a total number of passengers within a time interval associated to the departure time from the departure location;
   generating, by the one or more processors, a recommended check-in time for each of the plurality of users based on the travel information and the total number of passengers;
   generating, by the one or more processors, display information to be displayed by each of the plurality of user devices, the display information comprising the recommended check-in time;
   determining, by the one or more processors, for each of the plurality of users that a respective check-in condition and a security condition are satisfied based on the recommended check-in time; and
   in response to determining that the respective check-in condition and a security condition are satisfied, generating, by the one or more processors, a trigger for activating a setting of a ticket verification device to control a functionality of an access device that provides access to a portion of the departure location for each of the plurality of users based on the recommended check-in time, wherein the setting of the ticket verification device optimizes a secure access to station resources relative to departure times of respective transportation means.

2. The computer-implemented method of claim 1, wherein the travel information further comprises for each of the plurality of users one or more activity indicators.

3. The computer-implemented method of claim 2, wherein the one or more activity indicators comprise one or more entertainment interests.

4. The computer-implemented method of claim 3, further comprising retrieving a vendor information based on the travel information and matching the vendor information to the one or more activity indicators.

5. The computer-implemented method of claim 4, in response to matching, generating one or more recommended tasks available for the plurality of users before the recommended check-in time.

6. The computer-implemented method of claim 5, wherein generating the one or more recommended tasks is based on a maximum number of users per recommended task.

7. The computer-implemented method of claim 5, further comprising receiving an acceptance or rejection of the one or more recommended tasks and, in response to receiving the acceptance, generating credit points.

8. A non-transitory computer-readable storage medium coupled to one or more processors and having instructions stored thereon which, when executed by the one or more processors, cause the one or more processors to perform operations for crowd control based on check-in time recommendations, the operations comprising:
   receiving, from a plurality of user devices of a plurality of users, travel information, the travel information comprising, for each of the plurality of users, a user identification, a departure location, and a departure time;
   updating the travel information using an automatically tuning parameter;
   determining a total number of passengers within a time interval associated to the departure time from the departure location;
   generating a recommended check-in time for each of the plurality of users based on the travel information and the total number of passengers;
   generating display information to be displayed by each of the plurality of user devices, the display information comprising the recommended check-in time;
   determining for each of the plurality of users that a respective check-in condition and a security condition aresatisfied based on the recommended check-in time; and in response to determining that the respective check-in condition is satisfied, generating a trigger for activating a setting of a ticket verification device to control a functionality of an access device that provides access to a portion of the departure location for each of the plurality of users based on the recommended check-in time, wherein the setting of the ticket verification device optimizes a secure access to station resources relative to departure times of respective transportation means.

9. The non-transitory computer-readable storage medium of claim 8, wherein the travel information further comprises for each of the plurality of users one or more activity indicators.

10. The non-transitory computer-readable storage medium of claim 9, wherein the one or more activity indicators comprise one or more entertainment interests.

11. The non-transitory computer-readable storage medium of claim 10, further comprising retrieving a vendor information based on the travel information and matching the vendor information to the one or more activity indicators.

12. The non-transitory computer-readable storage medium of claim 11, in response to matching, generating one or more recommended tasks available for the plurality of users before the recommended check-in time.

13. The non-transitory computer-readable storage medium of claim 12, wherein generating the one or more recommended tasks is based on a maximum number of users per recommended task.

14. The non-transitory computer-readable storage medium of claim 12, further comprising receiving an acceptance or rejection of the one or more recommended tasks and, in response to receiving the acceptance, generating credit points.

15. A system, comprising:
a computing device; and
a computer-readable storage device coupled to the computing device and having instructions stored thereon which, when executed by the computing device, cause the computing device to perform operations for crowd control based on check-in time recommendations, the operations comprising:
receiving, from a plurality of user devices of a plurality of users, travel information, the travel information comprising, for each of the plurality of users, a user identification, a departure location, and a departure time;
updating the travel information using an automatically tuning parameter;
determining a total number of passengers within a time interval associated to the departure time from the departure location;
generating a recommended check-in time for each of the plurality of users based on the travel information and the total number of passengers;
generating display information to be displayed by each of the plurality of user devices, the display information comprising the recommended check-in time;
determining for each of the plurality of users that a respective check-in condition and a security condition aresatisfied based on the recommended check-in time; and
in response to determining that the respective check-in condition is satisfied, generating a trigger for activating a setting of a ticket verification device to control a functionality of an access device that provides access to a portion of the departure location for each of the plurality of users based on the recommended check-in time, wherein the setting of the ticket verification device optimizes a secure access to station resources relative to departure times of respective transportation means.

16. The system of claim 15, wherein the travel information further comprises for each of the plurality of users one or more activity indicators.

17. The system of claim 16, wherein the one or more activity indicators comprise one or more entertainment interests.

18. The system of claim 17, further comprising retrieving a vendor information based on the travel information and matching the vendor information to the one or more activity indicators.

19. The system of claim 18, in response to matching, generating one or more recommended tasks available for the plurality of users before the recommended check-in time.

20. The system of claim 19, further comprising receiving an acceptance or rejection of the one or more recommended tasks and, in response to receiving the acceptance, generating credit points.

* * * * *